(12) United States Patent
Liu et al.

(10) Patent No.: US 9,300,400 B2
(45) Date of Patent: Mar. 29, 2016

(54) COMMUNICATION THROUGH MULTIPLEXED ONE-DIMENSIONAL OPTICAL SIGNALS

(71) Applicants: Xiang Liu, Marlboro, NJ (US); Peter J Winzer, Aberdeen, NJ (US); Andrew R Chraplyvy, Matawan, NJ (US); Robert W Tkach, Little Silver, NJ (US); Chandrasekhar Sethumadhavan, Matawan, NJ (US)

(72) Inventors: Xiang Liu, Marlboro, NJ (US); Peter J Winzer, Aberdeen, NJ (US); Andrew R Chraplyvy, Matawan, NJ (US); Robert W Tkach, Little Silver, NJ (US); Chandrasekhar Sethumadhavan, Matawan, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 23 days.

(21) Appl. No.: 13/731,738

(22) Filed: Dec. 31, 2012

(65) Prior Publication Data
US 2013/0136449 A1 May 30, 2013

Related U.S. Application Data

(63) Continuation-in-part of application No. 13/601,236, filed on Aug. 31, 2012, which is a continuation-in-part of application No. 13/411,462, filed on Mar. 2, 2012, which is a continuation-in-part of application No.

(Continued)

(51) Int. Cl.
*H04B 10/12* (2006.01)
*H04B 10/2507* (2013.01)
(Continued)

(52) U.S. Cl.
CPC ...... *H04B 10/2507* (2013.01); *H04B 10/25137* (2013.01); *H04B 10/5053* (2013.01); *H04B 10/516* (2013.01)

(58) Field of Classification Search
CPC ............ H04B 2210/254; H04B 2210/25; H04B 2215/067; H04B 10/2507; H04B 10/2513; H04B 10/25137; H04B 10/516; H04B 10/5053; H04B 10/2543
USPC .................. 398/183–198, 147, 159, 81
See application file for complete search history.

(56) References Cited

U.S. PATENT DOCUMENTS 6,263,465 B1  7/2001  Gehlot
6,683,855 B1  1/2004  Bordogna et al.

(Continued)

FOREIGN PATENT DOCUMENTS

EP  1191726 A1  3/2002
EP  1341322 A2  9/2003

(Continued)

OTHER PUBLICATIONS

Pan Z et al: "Intrabit Polarization Diversity Modulation for the Mitigation of PMD Effects" IEEE Photonics Technology Letters, IEEE Service Center, Piscataway, NJ. US, vol. 14 No. 10, Oct. 1, 2002, pp. 1466-1468, XP011432458.

(Continued)

*Primary Examiner* — M. R. Sedighian
(74) *Attorney, Agent, or Firm* — Andrew R. Ralston

(57) ABSTRACT

An example apparatus comprises an optical transmitter which includes a first processor and at least two optical modulators. The first processor is configured to generate a first electronic representation for each of at least two optical signals for carrying payload data modulated according to a one-dimensional (1-D) modulation format, and to induce on respective ones of the first electronic representations an amount of dispersion that depends on a power-weighted accumulated dispersion ($AD_{PW}$) of a transmission link through which the at least two optical signals are to be transmitted thereby generating complex-valued electronic representations of pre-dispersion-compensated optical signals. Each of the at least two optical modulators modulate a respective analog version corresponding to a respective one of the complex-valued electronic representations onto a polarization of an optical carrier.

23 Claims, 5 Drawing Sheets

Related U.S. Application Data

13/245,160, filed on Sep. 26, 2011, now Pat. No. 8,824,501.

(60) Provisional application No. 61/535,548, filed on Sep. 16, 2011.

(51) Int. Cl.
  *H04B 10/2513* (2013.01)
  *H04B 10/516* (2013.01)
  *H04B 10/50* (2013.01)

(56) References Cited

U.S. PATENT DOCUMENTS

| | | | |
|---|---|---|---|
| 7,212,741 B2 | 5/2007 | Myong et a | |
| 7,424,651 B2 | 9/2008 | Domagala et al. | |
| 7,574,146 B2 | 8/2009 | Chiang et al. | |
| 7,688,918 B2 | 3/2010 | Koc | |
| 7,734,191 B1 | 6/2010 | Welch et al. | |
| 7,756,421 B2 * | 7/2010 | Roberts et al. | 398/158 |
| 2004/0105682 A1 | 6/2004 | Roberts et al. | |
| 2008/0075472 A1 | 3/2008 | Liu et al. | |
| 2008/0152361 A1 | 6/2008 | Chen et al. | |
| 2008/0279564 A1 | 11/2008 | Han et al. | |
| 2009/0238580 A1 * | 9/2009 | Kikuchi | 398/192 |
| 2010/0014872 A1 | 1/2010 | Fu et al. | |
| 2010/0158521 A1 | 6/2010 | Doerr et al. | |
| 2010/0329670 A1 | 12/2010 | Essiambre et al. | |
| 2010/0329671 A1 | 12/2010 | Essiambre et al. | |
| 2010/0329683 A1 * | 12/2010 | Liu | 398/81 |
| 2011/0038631 A1 | 2/2011 | Doerr | |

FOREIGN PATENT DOCUMENTS

| | | | | |
|---|---|---|---|---|
| WO | WO 2010/137113 | * | 2/2010 | H04J 14/04 |
| WO | 2010107439 A1 | | 9/2010 | |
| WO | 2010/137113 A1 | | 12/2010 | |

OTHER PUBLICATIONS

International Search Report—PCT/US2012/054755—Filing Date: Sep. 12, 2012, Mailing Date: Nov. 23, 2012—4 pages.

Eado Meron et al: "Use of Space Time Coding in Coherent Polarization-Multiplexed Systems Suffering From Polarization-Dependent Loss", Optics Letters, OSA, Optical Society of America, Washington, DC, US, vol. 35, No. 21, Nov. 2, 2010, pp. 3547-3549, XP001558183.

Gupta S et al: "Dispersion Penalty Mitigation Using Polarization Mode Multiplexing in Phase Diverse Analog Optical Links". Optical Fiber Communication/National Fiber Optic Engineers Conference, 2008, OFC/NFOEC 2008, Conference on, IEEE, Piscataway, NJ, USA, Feb. 24, 2008, pp. 1-3, XP031391214.

International Search Report—PCT/US2012/054813—Filing Date: Sep. 12, 2012, Mailing Date: Nov. 23, 2012—4 pages.

Chongjin Xie et al: "Electronic Nonlinearity Compensation in 112-Gb/s PDM-QPSK Optical Coherent Transmission Systems", 36th European Conference and Exhibition on Optical Communication ; (ECOC 2010); Torino, Italy, Sep. 19-23, 2010, IEEE, Piscataway, NJ, USA, Sep. 19, 2010, p. 103, XP031789766.

International Search Report—PCT/US2012/055012—Filing Date: Sep. 13, 2012, Mailing Date: Dec. 5, 2012—4 pages.

* cited by examiner

COMMUNICATION THROUGH MULTIPLEXED ONE-DIMENSIONAL OPTICAL SIGNALS

CROSS-REFERENCE TO RELATED APPLICATIONS

This application is a continuation-in-part of U.S. patent application Ser. No. 13/601,236 filed Aug. 31, 2012, which is continuation-in-part of U.S. patent application Ser. No. 13/411,462, filed Mar. 2, 2012, which is a continuation-in-part of U.S. patent application Ser. No. 13/245,160, filed Sep. 26, 2011, which claims the benefit of U.S. Provisional Patent Application No. 61/535,548, filed Sep. 16, 2011, both of which are incorporated herein by reference in their entirety.

FIELD

The invention(s) relate to optical communication equipment and, more specifically but not exclusively, to equipment for managing data transport through a nonlinear and/or noisy optical channel.

DESCRIPTION OF THE RELATED ART

This section introduces aspects that may help facilitate a better understanding of the invention(s). Accordingly, the statements of this section are to be read in this light and are not to be understood as admissions about what is in the prior art or what is not in the prior art.

Forward error correction (FEC) uses systematically generated redundant data to reduce the bit-error rate (BER) at the receiver. The cost of this reduction is a concomitant increase in the required forward-channel bandwidth, the latter being dependent on the overhead of the FEC code. In general, an FEC code with a larger overhead or lower net data rate is used for a noisier channel. When the channel conditions change over time, the net data rate and/or the FEC code can be adaptively changed to maintain an acceptable BER. However, one problem with FEC coding, as applied to optical transmission systems, is that the coding-gain differences among various implementable FEC codes usually do not exceed a certain maximum value, as given by Shannon's information capacity theory. In long-haul optical fiber transmission, fiber nonlinear effects further limit the transmission performance. In addition, the digital signal processing (DSP) complexity for capacity-approaching FEC codes can be forbiddingly high. Therefore, for certain optical fiber channels, additional and/or alternative performance-enhancement techniques may be needed to improve the transmission performance.

SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Methods for increasing nonlinear transmission performance without changing the transmission link include (1) using digital nonlinear compensation; and (2) using phase conjugated twin waves (PCTW) as described in U.S. patent application Ser. No. 13/601326, filed Aug. 31, 2012, incorporated herein by reference. Digital nonlinear compensation usually requires high digital signal processing (DSP) complexity, especially for dispersion-unmanaged optical fiber transmission where a large number of nonlinear compensation steps are required. In addition, digital nonlinear compensation usually only provides mitigation of intra-channel nonlinear impairments, and offers a modest improvement in nonlinear transmission performance in typical wavelength-division multiplexed transmission systems. PCTW provides improvement in the quality of an optical signal after transmission by performing digital constructive summation of a set of two or more optical variants. Optical variants are correlated optical signals which carry the same piece of payload data, bit-word, or bit sequence but differ from each other in at least one of their degrees of freedom, e.g., in one or more of the time of transmission, spatial localization, polarization of light, optical carrier wavelength and subcarrier frequency. The constructive summation tends to average out, to a certain degree, the deleterious effects of both linear and nonlinear noise/distortions imparted on the individual optical variants in the optical transmission link because said noise/distortions are incoherent in nature. The optical variants can be the same as the original optical signal intended for transmission, or phase-scrambled copies of the original signal.

Nonlinear distortions imparted on two phase-conjugated signals during transmission can be essentially opposite to each other (or anti-correlated) when the phase conjugation is removed at the receiver. Therefore, when two phase-conjugated optical variants carrying the same modulated payload symbols are coherently summed after removing the phase conjugation between them, the nonlinear distortions imparted on the two phase-conjugated optical variants would essentially cancel. It is further found that in highly dispersive transmission, application of a symmetric dispersion map may be additionally utilized in order to achieve a more effective cancellation of the nonlinear distortions imparted on the two phase-conjugated optical variants. The symmetric dispersion map can be realized by pre-compensating the phase-conjugated optical variants by an amount of dispersion that depends on the accumulated dispersion (e.g., power-weighted accumulated dispersion ($AD_{PW}$)) of a transmission link, through which the optical variants are to be transmitted. This methodology effectively improves signal quality after nonlinear dispersive transmission, beyond what can be achieved by coherently summing two optical variants that are either duplicated or phase-scrambled copies of a same optical signal.

It has been recently found that Polarization-Division-Multiplexed Binary-Phase-Shift-Keying (PDM-BPSK) offers <~3 dB improvement (in signal Q factor) as compared to PDM Quadrature-Phase-Shift-Keying (PDM-QPS)K (for the same moduation symbol rate) in dispersion-uncompensated transmission links. PCTW have been found to offer >5.5 dB improvement over PDM-QPSK (again for the same modulation symbol rate). However, the implementation of PCTW requires an accurate phase alignment between the twin waves.

Accordingly, provided herein are methodologies in which (1) a pair of multiplexed 1-Dimensional signals (M-1DS) are generated, which may be generated by performing an unitary transform on a PCTW; (2) a pre-determined amount of dispersion is added on the components of the M-1DS, such that the power-weighted dispersion distribution (PWDD) function of the transmission link is centered near zero; (3) the pre-dispersion-compensated M-1DS (PreC-M-1DS) are transmitted over an optical transmission link; (4) and coherently detected at an optical receiver; and (5) the data carried by the M-1D is recovered. The M-1DS can be multiplexed via polarization-division multiplexing (PDM), wavelength-division multiplexing (WDM), or space-division multiplexing (SDM), before the signals are transmitted through the transmission link. Embodiments according to the principles described result in the fiber nonlinear penalty being substantially reduced. When the M-1DS are multiplexed through PDM, the nonlinear distortions (or noises) of these two polarization components of the M-1D are "squeezed" along the direction that is orthogonal to the decision line of the 1-D signal, and would not cause decision errors. The described modulation scheme using PMD is referred to herein as "optimally pre-compensated PDM 1-D modulation" (PreC-PDM-1D). Common 1-D modulation formats include binary phase-shift keying (BPSK) and m-ary pulse-amplitude modulation (m-PAM).

One example apparatus comprises an optical transmitter which includes a first processor and at least two optical modulators. The first processor is configured to generate a first electronic representation for each of at least two optical signals for carrying payload data modulated according to a one-dimensional (1-D) modulation format, and to induce on respective ones of the first electronic representations an amount of dispersion that depends on a power-weighted accumulated dispersion ($AD_{PW}$) of a transmission link through which the at least two optical signals are to be transmitted thereby generating complex-valued electronic representations of pre-dispersion-compensated optical signals. Each of the at least two optical modulators modulate a respective analog version corresponding to a respective one of the complex-valued electronic representations onto a polarization of an optical carrier.

In one embodiment, the 1-D modulation format is Binary Phase Shift Keying (BPSK) or m-ary Pulse Amplitude Modulation (m-PAM).

In one embodiment, the first processor is further configured to generate the respective ones of the first electronic representations by performing a unitary transformation on corresponding electronic representations of two phase-conjugated optical signals that are modulated according to a two-dimensional (2-D) modulation format. The unitary transformation may have a generic form of $$\frac{1}{\sqrt{2}}\begin{pmatrix} 1 & 1 \\ -j & j \end{pmatrix}.$$

In one embodiment, the 2-D modulation format is a complex valued modulation, quadrature phase-shift keying (QPSK), or n-constellation-point quadrature-amplitude modulation (n-QAM).

In one embodiment, the first processor is configured to generate the first electronic representations for two optical signals for carrying payload data modulated according to a one-dimensional (1-D) modulation format; and wherein each of the first electronic representations is generated by performing a unitary transformation on corresponding electronic representations of two phase-conjugated optical signals that are modulated according to a two-dimensional (2-D) modulation format.

In one embodiment, the at least two modulators are IQ modulators for modulating the complex-valued electronic representations of the pre-dispersion compensated optical signals.

In one embodiment, the transmitter also includes at least two Digital-to-Analog Converters (DACs) for converting respective real and imaginary parts of one of the complex-valued electronic representations to analog representations prior to modulation.

In one embodiment, the processor is configured to generate the first electronic representations by convolving an E-field representation with a pre-dispersion-compensation function.

In one embodiment, the at least two optical signals outputted from the at least two optical modulators are multiplexed via polarization-division multiplexing (PDM), wavelength-division multiplexing (WDM), or space-division multiplexing (SDM), before the at least two optical signals are transmitted through a transmission link.

In one embodiment, the amount of dispersion induced on the first electronic representations at least depends on a power-weighted accumulated dispersion of the transmission link through which the at least two optical signals are to be transmitted.

In one embodiment, the first processor is configured use the overlap-and-add method to electronically pre-compensate complex fields representing the at least two optical signals modulated according to a one-dimensional (1-D) modulation format.

In one embodiment, the apparatus comprises two optical modulators configured to generate two orthogonally-polarized pre-dispersion-compensated optical signals at a same wavelength.

In one embodiment, the apparatus also includes an optical receiver for receiving versions of at least two pre-dispersion-compensated optical signals that are originally modulated according to a 1-D modulation format.

In one embodiment, the optical receiver includes a front-end circuit configured to convert the polarization components of the received versions of at least two pre-dispersion-compensated optical signals carrying modulated payload data into a corresponding plurality of digital electrical signals, and a second processor configured to: process complex values representing the received versions to obtain electronic representations of transmitted 1-D signals and determine payload data based on the electronic representations of the transmitted 1-D signals.

In one embodiment, the second processor is configured to process the complex values representing the received versions to obtain the electronic representations of the transmitted 1-D signals is configured to perform one or more of post-dispersion compensation, time synchronization, channel estimation, channel compensation, frequency estimation, frequency compensation, carrier phase estimation, carrier phase compensation, and forward error correction.

In one embodiment, the second processor is configured to perform an inverse transform corresponding to a unitary transform on ones of the electronic representations of the transmitted 1-D signals to obtain two phase-conjugated 2-D signals, and perform coherent superposition of the two phase-conjugated 2-D signals.

In one embodiment, the inverse transformation has a generic form of $$\frac{1}{\sqrt{2}}\begin{pmatrix} 1 & j \\ 1 & -j \end{pmatrix}.$$

In one example method comprising a first processor generates a first electronic representation for each of at least two optical signals for carrying payload data modulated according to a one-dimensional (1-D) modulation format, and ones of at least two optical modulators modulate a respective analog versions corresponding to a respective one of the first electronic representations having induced thereon an amount of dispersion that depends on an accumulated dispersion (AD) of a transmission link through which the at least two optical signals are to be transmitted.

In one embodiment, generating the first electronic representations comprises performing pre-dispersion-compensation to induce an amount of dispersion on the first electronic representation for each of at least two optical signals in the time domain. In one embodiment, generating the first electronic representations comprises performing the pre-dispersion-compensation to induce an amount of dispersion on the first electronic representation for each of at least two optical signals in the frequency domain.

In one embodiment, the amount of dispersion induced on the at least two optical signals is about—$AD_{PW}/2$, where $AD_{PW}$ is the power-weighted accumulated dispersion of the transmission link through which the two optical signals are to be transmitted.

In one embodiment, the method includes generating respective ones of the first electronic representations by performing a unitary transformation on a corresponding electronic representation of ones of at least two phase-conjugated optical signals modulated according to a two-dimensional (2-D) modulation format.

In one embodiment, said generating comprises generating the first electronic representations of two optical signals for carrying payload data modulated according to a one-dimensional (1-D) modulation format, wherein the first electronic representations are generated by performing a unitary transformation on corresponding electronic representations of two phase-conjugated optical signals modulated according to a two-dimensional (2-D) modulation format.

In one embodiment, the at least two optical signals outputted from the at least two optical modulators are multiplexed via polarization-division multiplexing (PDM), wavelength-division multiplexing (WDM), or space-division multiplexing (SDM), before the signals are transmitted through a transmission link.

In one embodiment, the at least two optical signals are received by an optical receiver for recovering the payload data.

BRIEF DESCRIPTION OF THE DRAWINGS

Other aspects, features, and benefits of various embodiments of the invention will become more fully apparent, by way of example, from the following detailed description and the accompanying drawings, in which.

Figure 1:
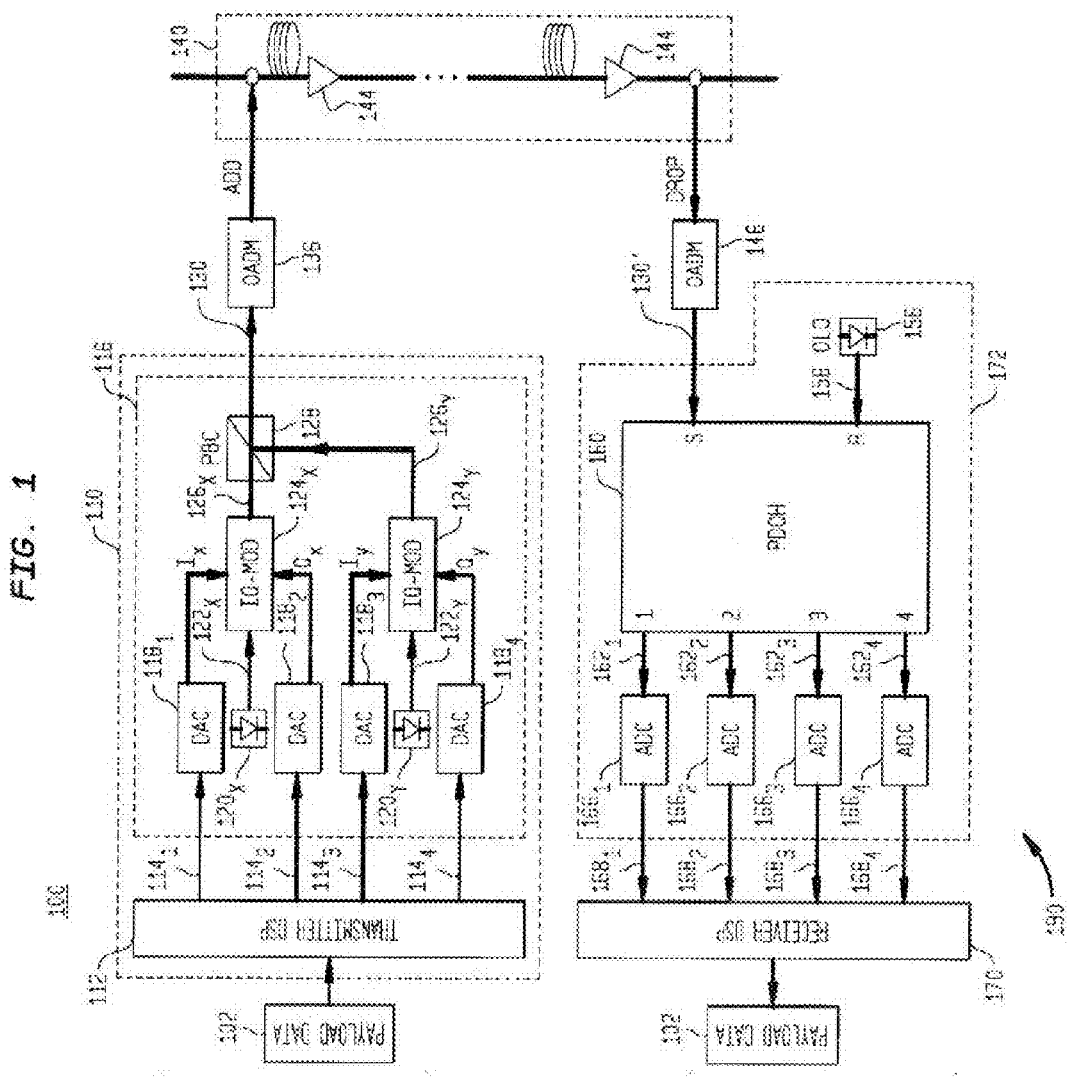
FIG. 1 shows a block diagram of an optical transmission system according to one embodiment of the invention.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

FIG. 1 shows a block diagram of an optical transmission system 100 according to one embodiment of the invention. System 100 has an optical transmitter 110 that is configured to transmit a pair of multiplexed 1-D optical signals (M-1DS) through polarization-division multiplexing (PDM). System 100 also has an optical receiver 190 that is configured to process the received optical signals to recover the corresponding original data in a manner that reduces the BER compared to the BER attainable without use of embodiments of the invention. Transmitter 110 and receiver 190 are connected to one another via an optical transmission link 140.

Transmitter 110 receives an input stream 102 of payload data and applies it to a digital signal processor (DSP) 112. Processor 112 processes input stream 102 to generate digital signals $114_1$-$114_4$. In each signaling interval (time slot), signals $114_1$ and $114_2$ carry digital values that represent the in-phase (I) component and quadrature (Q) component, respectively, of a corresponding constellation symbol intended for transmission using X-polarized light. Signals $114_3$ and $114_4$ similarly carry digital values that represent the I and Q components, respectively, of the corresponding constellation symbol intended for transmission using Y-polarized light. Digital signals $114_1$-$114_4$ are also pre-dispersion-compensated by an amount of dispersion that depends on the power-weighted accumulated dispersion ($AD_{PW}$) of a transmission link through which the two optical signals are to be transmitted. When the signal power evolution of a given span of the fiber link is unknown, a nominal average power that is dependent on the signal launch power into this span can be assumed for this span. Given a typical fiber loss coefficient of 0.2 dB/km, and a typical fiber span length of 100 km, the nominal average power is about 5 times less than the signal launch power. Note that although each 1-D signal can be represented by a real-valued waveform, complex-valued waveform (having both I and Q components) is needed to represent the 1-D signal after pre-dispersion compensation.

An electrical-to-optical (E/O) converter (also sometimes referred to as a front end) 116 of transmitter 110 transforms digital signals $114_1$-$114_4$ into a modulated optical output signal 130. More specifically, digital-to-analog converters (DACs) $118_1$ and $118_2$ transform digital signals $114_1$ and $114_2$ into an analog form to generate drive signals $I_X$ and $Q_X$, respectively. Drive signals $I_X$ and $Q_X$ are then used, in a conventional manner, to drive an I-Q modulator $124_X$. Based on drive signals $I_X$ and $Q_X$, I-Q modulator $124_X$ modulates an X-polarized beam $122_X$ of light supplied by a laser source $120_X$, thereby generating a modulated optical signal $126_X$.

DACs $118_3$ and $118_4$ similarly transform digital signals $114_3$ and $114_4$ into an analog form to generate drive signals $I_Y$ and $Q_Y$, respectively. Based on drive signals $I_Y$ and $Q_Y$, an I-Q modulator $124_Y$ modulates a Y-polarized beam $122_Y$ of light supplied by a laser source $120_Y$, thereby generating a modulated optical signal $126_Y$. A polarization beam combiner 128 combines modulated optical signals $126_X$ and $126_Y$ to generate optical output signal 130.

The pair of pre-dispersion-compensated 1-D optical signals are transmitted over an optical transmission link in different dimensions, e.g., in one or more of the time of transmission, spatial localization, polarization of light, optical carrier wavelength, and subcarrier frequency. More details on the use of different dimensions in transmitting the optical signals can be found in U.S. patent application Ser. No. 13/601,326, filed Aug. 31, 2012, which is continuation-in-part of U.S. patent application Ser. No. 13/411,462, filed Mar. 2, 2012, which is a continuation-in-part of U.S. patent application Ser. No. 13/245,160, filed Sep. 26, 2011.

The processor 112 may also add pilot symbols and/or pilot-symbol sequences to each of signals $114_1$, $114_2$, $114_3$, and $114_3$. One purpose of the added pilot symbols and/or pilot-symbol sequences is to form an optical frame having a well-defined structure. This structure can be used at receiver 190 to distinguish the optical symbols corresponding to the payload data from the pilot symbols/sequences, and to ensure the phase alignment between the optical variants. The pilot symbols/sequences can then be used to perform one or more of (i) time synchronization, (ii) channel estimation and compensation, (iii) frequency estimation and compensation, and (iv) phase estimation and compensation. An enabling description of possible frame structures and suitable pilot symbols/sequences can be found, e.g., in commonly owned U.S. patent application Ser. No. 12/964,929 (filed on Dec. 10, 2010), which is incorporated herein by reference in its entirety.

System 100 has an optical add-drop multiplexer (OADM) configured to add signal 130, as known in the art, to other optical signals that are being transported via optical transmission link 140. Link 140 is illustratively shown as being an amplified link having a plurality of optical amplifiers 144 configured to amplify the optical signals that are being transported through the link, e.g., to counteract signal attenuation. Note that an optical link that does not have optical amplifiers can alternatively be used as well. After propagating the intended length of link 140, signal 130 is dropped from the link via another optical add-drop multiplexer, OADM 146, and directed to receiver 190 for processing. Note that the optical signal applied to receiver 190 by OADM 146 is labeled 130', which signifies the fact that, while in transit between transmitter 110 and receiver 190, signal 130 may accumulate noise and other signal distortions due to various linear effects and nonlinear effects in the optical fiber. One type of a fiber nonlinear effect is intra-channel four-wave mixing (IFWM), which is a function of the phases and amplitudes of the corresponding optical symbols. Another type of a fiber nonlinear effect is inter-channel cross-phase modulation (XPM) caused by neighboring wavelength-division multiplexed (WDM) channels.

Receiver 190 has a front-end circuit 172 comprising an optical-to-electrical (O/E) converter 160, four analog-to-digital converters (ADCs) $166_1$-$166_4$, and an optical local oscillator (OLO) 156. O/E converter 160 has (i) two input ports labeled S and R and (ii) four output ports labeled 1 through 4. Input port S receives optical signal 130'. Input port R receives an optical reference signal 158 generated by optical local oscillator 156. Reference signal 158 has substantially the same optical-carrier frequency (wavelength) as signal 130'. Reference signal 158 can be generated, e.g., using a tunable laser controlled by a wavelength-control loop (not explicitly shown in FIG. 1) that forces an output wavelength of the tunable laser to closely track the carrier wavelength of signal 130'.

O/E converter 160 operates to mix input signal 130' and reference signal 158 to generate eight mixed optical signals (not explicitly shown in FIG. 1). O/E converter 160 then converts the eight mixed optical signals into four electrical signals $162_1$-$162_4$ that are indicative of complex values corresponding to the two orthogonal-polarization components of signal 130'. For example, electrical signals $162_1$ and $162_2$ may be an analog in-phase signal and an analog quadrature-phase signal, respectively, corresponding to the X-polarization component of signal 130'. Electrical signals $162_3$ and $162_4$ may similarly be an analog in-phase signal and an analog quadrature-phase signal, respectively, corresponding to the Y-polarization component of signal 130'.

In one embodiment, O/E converter 160 is a polarization-diverse 90-degree optical hybrid (PDOH) with four balanced photo-detectors coupled to its eight output ports. Additional information on various O/E converters that can be used to implement O/E converter 160 in various embodiments of system 100 are disclosed, e.g., in U.S. Patent Application Publication Nos. 2010/0158521 and 2011/0038631, and International Patent Application No. PCT/US09/37746 (filed on Mar. 20, 2009), all of which are incorporated herein by reference in their entirety.

Each of electrical signals $162_1$-$162_4$ generated by O/E converter 160 is converted into digital form in a corresponding one of ADCs $166_1$-$166_4$. Optionally, each of electrical signals $162_1$-$162_4$ may be amplified in a corresponding amplifier (not explicitly shown) prior to the resulting signal being converted into digital form. Digital signals $168_1$-$168_4$ produced by ADCs $166_1$-$166_4$ are processed by a digital signal processor (DSP) 170, e.g., as further described below in reference to FIG. 3, to recover the data of the original input stream 102 applied to transmitter 110.

Figure 2:
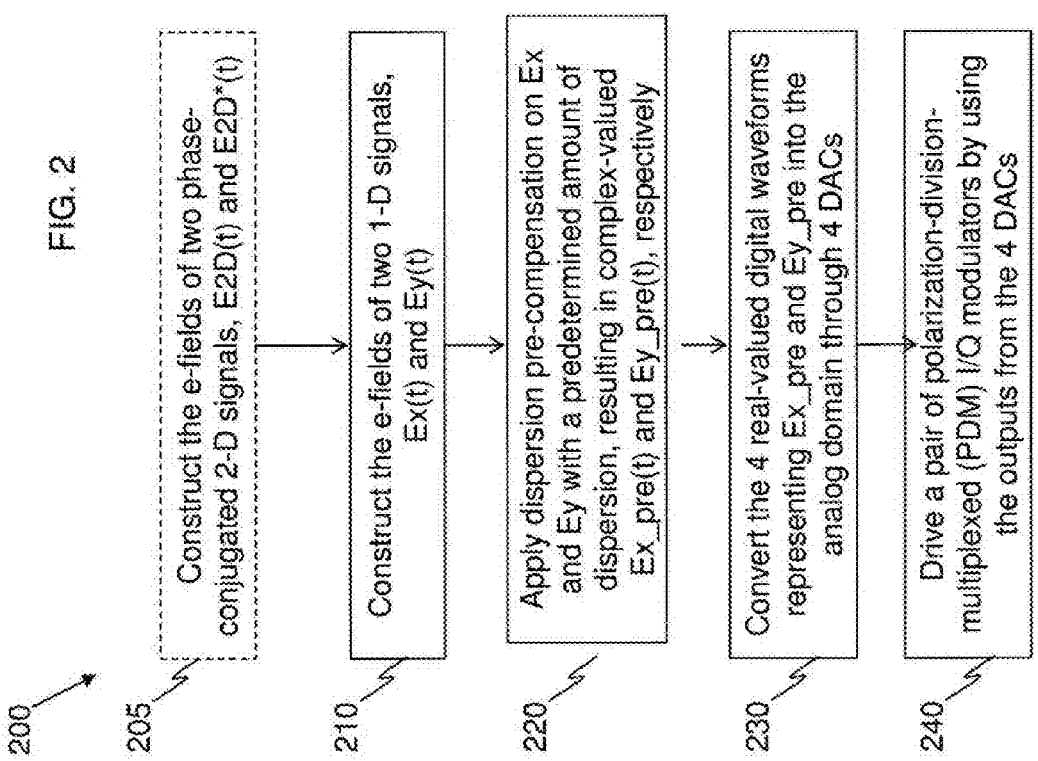
FIG. 2 shows a flowchart of a signal-processing method that can be implemented in the transmitter of the optical transmission system shown in FIG. 1 according to one embodiment of the invention.

FIG. 2 shows a flowchart of a signal-processing method 200 that can be employed by processor 112 (FIG. 1) to generate digital signals $114_1$-$114_4$ according to one embodiment of the invention where pre-dispersion-compensated optical signals modulated according to a one dimensional (1-D) modulation format are carried on two orthogonal polarization states of a same wavelength channel.

At optional step 205 of method 200, payload data 102 are processed to obtain the payload signal sequence, $E_{2D}(t)$, using a given two-dimensional (2-D) modulation format. The 2-D modulation format used can be selected from the group consisting of complex valued modulation, quadrature phase-shift keying (QPSK), n-constellation-point quadrature-amplitude modulation (n-QAM), or any suitable combination thereof. This step may include the payload signal sequence $E_{2D}(t)$, and its phase-conjugated variant $E_{2D}^*(t-\tau)$ are respectively assigned to the x-polarization and y-polarization components of the optical signal to be modulated At step 210 of method 200, either payload data 102 are processed to obtain the a pair of signal sequences, Ex(t) and Ey(t), using a given one-dimensional (1-D) modulation format. The 1-D modulation format used can be selected from the group consisting of Binary Phase Shift Keying (BPSK) or m-ary Pulse Amplitude Modulation (m-PAM) or any suitable combination thereof. The pair of 1-D signals can also be obtained by performing a unitary transformation on two phase-conjugated signals modulated according to a two-dimensional (2-D) modulation format to carry the payload data. In one embodiment, the unitary transformation is in the generic form of $$\frac{1}{\sqrt{2}} \begin{pmatrix} 1 & 1 \\ -j & j \end{pmatrix}.$$

By generic form it is meant that the given generic form can be further transformed, e.g., multiplied by a complex constant, and retain the same effect.

At step 220 of method 200, pre-dispersion compensation is applied to the E-fields of both x- and y-polarization components of the optical signal to be modulated resulting in complex-valued E-fields, Ex_pre and Ey_pre respectively. The amount of dispersion induced by the pre-dispersion compensation depends on $AD_{PW}$, where $AD_{PW}$ is the power-weighted accumulated dispersion of optical fiber transmission link 140. As an example, the power-weighted accumulated dispersion of a transmission link comprising multiple optically amplified homogenous fiber spans is defined as:

$$AD_{PW} = \frac{1}{L_{eff}} \int_0^L e^{G(z)} C(z) dz, \tag{1}$$

where L is the link distance, and C(z) is accumulated dispersion at distance z along the transmission link $$C(z) = \int_0^z \beta_2(z') dz', \tag{2}$$

where $\beta_2(z')$ is the group-velocity dispersion coefficient at distance z' along the link.

In the above equation, G(z) is the logarithmic loss/gain evolution of the optical signal $$G(z) = \int_0^z [g(z') - \alpha(z')] dz', \tag{3}$$

where g(z') and α(z') are the gain and loss coefficients at distance z' along the transmission link, respectively, and $L_{eff}$ is the effective length of the transmission link $$L_{eff} = \int_0^L e^{G(z)} dz. \tag{4}$$

To generate "pre-dispersion-compensated" optical signals, the E-fields of the original signals, $E_{n, Pre}(t)$, are effectively convolved with a pre-dispersion-compensation function $H_{Pre}(t)$ as follows $$E_{n, Pre}(t) = H_{Pre}(t) \otimes E_n(t) \tag{5}$$

where '⊗' denotes convolution as defined:

$$H(t) \otimes E(t) = \int_{-\infty}^{\infty} H(\tau) E(t-\tau) d\tau. \tag{6}$$

A convolution is the integral of the product of two functions after one is reversed and shifted producing a third function that is typically viewed as a modified version of one of the original functions, giving the area overlap between the two functions as a function of the amount that one of the original functions is translated. The above convolution operation can be simply realized in the frequency domain as $$H(t) \otimes E(t) = F^{-1}\{F[H(t)] \cdot F[E(t)]\}, \tag{7}$$

where F(x) is the Fourier transform of function x. The size of the discrete Fourier transform (DFT) and inverse DFT (IDFT) used to covert time-domain signal E-field to the frequency domain and back can vary between being at least the same size as the dispersion-induced channel memory length to 10 times such length, the size being chosen to balance processing latency and hardware requirements with acceptable accuracy. The size of the DFT and IDFT used to covert time-domain signal E-field to the frequency domain and back is usually a few times the dispersion-induced channel memory length. The frequency-domain dispersion compensation can be realized by using the overlap-and-add approach. A more detailed description on the overlap-and-add approach can be found in a paper entitled "Coherent optical single carrier transmission using overlap frequency domain equalization for long-haul optical systems," published in J. Lightwave Technol., 27, 3721-3728 (2009) by R. Kudo, T. Kobayashi, K. Ishihara, Y. Takatori, A. Sano, and Y. Miyamoto, which is incorporated herein by reference in its entirety.

In one embodiment, the amount of dispersion induced by the pre-dispersion compensation is preferably about— $AD_{PW}/2$, where $AD_{PW}$ is the power-weighted accumulated dispersion of optical fiber transmission link 140. Under this condition, the dispersion map is made symmetric about zero dispersion (i.e., pre-dispersion compensation applied such that about half way through the transmission link, the accumulated dispersion is zero), we have $$C(z) \approx -C(L-z), \quad (8)$$

and $$G(z) \approx G(L-z). \quad (9)$$

The dimensionless nonlinear transfer function, defined as $$\eta(\xi) = \frac{1}{L_{eff}} \int_0^L e^{G(z) - i\xi C(z)} dz, \quad (10)$$

then becomes essentially a real-valued number, when Eqs. (8) and (9) are applied, because $$\eta(\xi) = \frac{1}{L_{eff}} \int_0^{L/2} [e^{G(z) - i\xi C(z)} + e^{G(L-z) - i\xi C(L-z)}] dz \approx \quad (11)$$
$$\frac{1}{L_{eff}} \int_0^{L/2} 2e^{G(z)} \cos[\xi C(z)] dz.$$

This means that, for the case of transmission with the symmetric dispersion map, we have $$\eta(\xi) \approx \eta(\xi)^* \quad (12)$$

Based on a perturbation approach, we can express the nonlinear distortion on the E-field of an optical signal (E) after the transmission in the frequency domain as $$\delta E(L, \omega) = i\frac{8}{9}\gamma P_0 L_{eff} \int_{-\infty}^{+\infty} d\omega_1 \quad (13)$$
$$\int_{-\infty}^{+\infty} d\omega_2 \eta(\omega_1 \omega_2) E(\omega + \omega_1) E(\omega + \omega_2) E^*(\omega + \omega_1 + \omega_2)$$

where i is the imaginary unit, * denotes complex conjugate, $P_0$, $\gamma$ are respectively the fiber nonlinear Kerr coefficient and mean average signal launch power into each fiber span.

In the case of PCTW-based transmission, the phase-conjugated optical variant $E_c(t)$ is equal to $E(t)^*$ before transmission. In the frequency domain, we have $E_c(\omega) = E(-\omega)^*$ using the conjugation property of Fourier transform (e.g., see http://en.wikipedia.org/wiki/Fourier transform). We can then write the nonlinear distortion on the E-field of the phase-conjugated optical variant as $$\delta E_C(L, \omega) = i\frac{8}{9}\gamma P_0 L_{eff} \int_{-\infty}^{+\infty} d\omega_1 \int_{-\infty}^{+\infty} d\omega_2 \eta(\omega_1 \omega_2) \quad (14)$$
$$E_C(-\omega - \omega_1) E_C(-\omega - \omega_2) E_C^*(-\omega - \omega_1 - \omega_2)$$
$$= i\frac{8}{9}\gamma P_0 L_{eff} \int_{-\infty}^{+\infty} d\omega_1 \int_{-\infty}^{+\infty} d\omega_2 \eta(\omega_1 \omega_2)$$

-continued
$$E^*(-\omega - \omega_1) E^*(-\omega - \omega_2) E(-\omega - \omega_1 - \omega_2)$$
$$\approx \left[ -i\frac{8}{9}\gamma P_0 L_{eff} \int_{-\infty}^{+\infty} d\omega_1 \int_{-\infty}^{+\infty} d\omega_2 \eta(\omega_1 \omega_2) \right.$$
$$\left. E(-\omega + \omega_1) E(-\omega + \omega_2) E^*(-\omega + \omega_1 + \omega_2) \right]^*$$
$$\approx [-\delta E(L, -\omega)]^*$$

In the derivation of the above equation, we use the fact that $\eta(\omega_1 \omega_2)$ is essentially real-valued, or $\eta(\omega_1 \omega_2) \approx \eta(\omega_1 \omega_2)^*$, based on Eq. (12). The above equation reveals that the nonlinear distortions experienced by two phase-conjugated optical variants are opposite to each other or anti-correlated in the time domain (after their phase conjugation relation is removed), i.e., $$[\delta E_c(L,t)]^* = F\{[\delta E_c(L,\omega)]^*\} \approx F\{-[\delta E(L,-\omega)]^*\}^* = [-\delta E(L,t)^*]^* = -\delta E(L,t) \quad (15)$$

Where F{ } denotes the Fourier transform. So, the full cancellation of nonlinear distortions upon coherent superposition of the received phase-conjugated optical variants is evident from $$E(L,t) + [E_c(L,t)]^* = [E(t) + \delta E(L,t)] + [E^*(t) + \delta E_c(L,t)]^* =$$
$$E(t) + \delta E(L,t) + E(t) + [\delta E_c(L,t)]^* \approx 2E(t) \quad (16)$$

In the case of transmission with optical signals modulated according to a 1-D modulation format, each signal waveform can be expressed as real-valued, or $E(t) = E(t)^*$, we have $$E(\omega) = E(-\omega)^* \quad (17)$$

Using Eq. (13), we then have $$[\delta E(L, -\omega)]^* = -i\frac{8}{9}\gamma P_0 L_{eff} \int_{-\infty}^{+\infty} d\omega_1 \int_{-\infty}^{+\infty} d\omega_2 \eta(\omega_1 \omega_2) \quad (18)$$
$$E^*(-\omega + \omega_1) E^*(-\omega + \omega_2) E(-\omega + \omega_1 + \omega_2)$$
$$= -i\frac{8}{9}\gamma P_0 L_{eff} \int_{-\infty}^{+\infty} d\omega_1 \int_{-\infty}^{+\infty} d\omega_2 \eta(\omega_1 \omega_2)$$
$$E(\omega - \omega_1) E(\omega - \omega_2) E^*(\omega - \omega_1 - \omega_2)$$
$$= -i\frac{8}{9}\gamma P_0 L_{eff} \int_{-\infty}^{+\infty} d\omega_1 \int_{-\infty}^{+\infty} d\omega_2 \eta(\omega_1 \omega_2)$$
$$E(\omega + \omega_1) E(\omega + \omega_2) E^*(\omega + \omega_1 + \omega_2)$$
$$= -\delta E(L, \omega)$$

which means that the nonlinear distortions $\delta E(L,t)$, are purely imaginary. As the original signal E(t) is real-valued, the nonlinear distortions $\delta E(L,t)$ are thus "squeezed" along the direction that is orthogonal to the decision line (or the nonlinear distortions are "parallel" to the decision line), and would not cause decision errors (to first order). These results suggest that in effect, the "nonlinear distortion cancellation" effect in the case of PCTW is manifested as the "nonlinear distortion squeezing" effect for 1-D modulation formats such as BPSK and m-PAM.

It is remarkable that the above cancellation or squeezing of nonlinear distortions is achieved even in the presence of large dispersion during fiber transmission (because the nonlinear distortions at different link locations are different due to the different accumulated dispersion values at these locations), when an appropriate amount of dispersion is induced on the phase-conjugated optical variants at the transmitter side through pre-dispersion-compensation to make the link dispersion map symmetric about zero dispersion.

At step 230 of method 200, the digital representations of the real and imaginary parts of the E-field of the x-polarization component are converted into analog waveforms by DACs $118_1$ and $118_2$. At the same time, the digital representations of the real and imaginary parts of the E-field of the y-polarization component are converted into analog waveforms by DACs $118_3$ and $118_4$.

At step 240 of method 200, a pair of polarization-division-multiplexed I/Q modulators $124_X$ and $124_Y$ driven by respective outputs from the DACs $118_1$ and $118_2$ to generate PDM optical signal 130. While a two-polarization PDM optical signal is illustrated by this embodiment, multiple such PDM optical signals may be constructed in a similar fashion.

Figure 3:
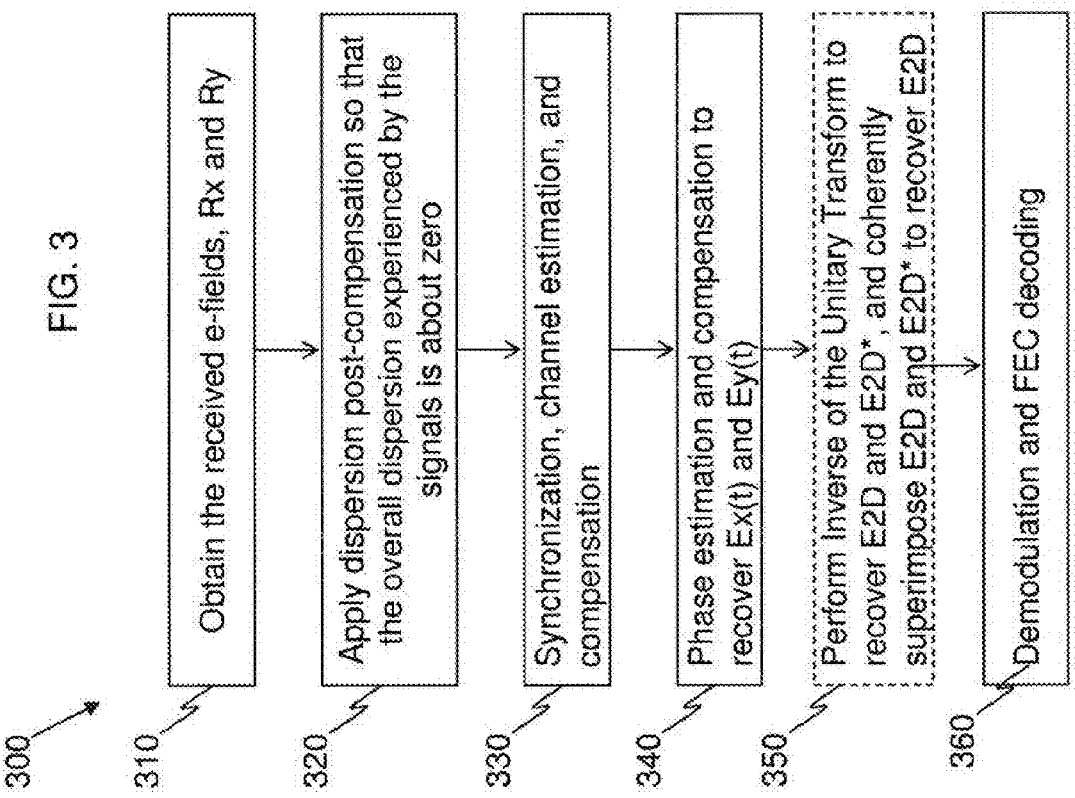
FIG. 3 shows a flowchart of a signal-processing method that can be implemented in the receiver of the optical transmission system shown in FIG. 1 according to one embodiment of the invention.

FIG. 3 shows a flowchart of a signal-processing method 300 that can be employed by processor 170 (FIG. 1) to recover data stream 102 from digital signals $168_1$-$168_4$ according to one embodiment of the invention where pre-dispersion-compensated optical signals are carried on two orthogonal polarization states of a same wavelength channel.

At step 310 of method 300, digital signals $168_1$-$168_4$ are processed to construct two received optical fields corresponding to two orthogonal polarization components, $R_X(t)$ and $R_y(t)$.

At step 320 of method 300, post-dispersion compensation is applied to the E-fields of both x'- and y'-polarization components of the received optical signal. The amount of dispersion induced by the post-dispersion compensation is preferably chosen to bring the overall dispersion experienced by the signal variants to essentially zero. The post-dispersion compensation can be implemented in the frequency domain, e.g., by using the overlap-and-add approach.

At step 330 of method 300, digital signal processing is applied to achieve time and frequency synchronization. In a representative implementation, the time-synchronization procedure of step 330 relies on certain properties of pilot-symbol sequences to determine the start of each optical frame. The known structure of the optical frame can then be used to identify time slots that have digital samples and/or digital-signal portions corresponding to the optical symbols carrying the payload data. The frequency-synchronization procedure of step 330 may perform electronic estimation and compensation of a mismatch between the carrier-frequency of input signal 130' and the frequency of reference signal 158 (see FIG. 1). After the frequency offset is determined, frequency-mismatch can be compensated, e.g., by applying to each digital sample a phase shift equal to the frequency offset multiplied by $2\pi$ and the time elapsed between the start of the frame and the temporal position of the digital sample.

At step 330 of method 300, additional signal processing is applied to achieve channel estimation and compensation, and phase estimation and compensation to recover the E-fields of the original x- and y-polarization components, $E_x(t)$ and $E_y(t)$, as assigned at transmitter 110. The channel-estimation/compensation procedure of step 330 performs electronic estimation and compensation of the phase and amplitude distortions imposed by optical fiber transmission link 140, due to effects such as chromatic dispersion, polarization rotation, and polarization-mode dispersion. In one embodiment, the channel estimation relies on digital samples corresponding to pilot symbols to determine the channel-response function, H, of optical fiber transmission link 140. The inverse channel-response function $H^{-1}$ is then applied to the digital samples corresponding to payload data to perform channel compensation. In another embodiment, the channel estimation relies on blind adaptive equalization schemes such as constant modulus algorithm (CMA), and modified version of CMA.

At step 340, phase estimation and phase compensation are also performed, e.g., through the assistance of pilot symbols to correct or compensate for slowly changing phase shifts between input signal 130' and reference signal 158 (FIG. 1). Various methods that can be used for this purpose are disclosed, e.g., in U.S. Patent Application Publication Nos. 2008/0152361 and 2008/0075472 and U.S. Pat. No. 7,688,918, all of which are incorporated herein by reference in their entirety. Blind phase estimation schemes such as the Viterbi-Viterbi algorithm and the blind phase search algorithm can also be used. In this manner the plurality of digital electrical signals are processed to generate a set of values representing 1-D modulated payload symbols.

At optional step 350, an inverse transform corresponding to a unitary transform that generated the electronic representations of the 1-D modulated signals is performed to obtain two phase-conjugated 2-D modulated signals, E2D and E2D*. In one embodiment, the inverse transformation has a generic form of $$\frac{1}{\sqrt{2}}\begin{pmatrix} 1 & j \\ 1 & -j \end{pmatrix}.$$

Then, coherent superposition of the two phase-conjugated 2-D signals is performed to recover the original 2-D signal, E2D. In one embodiment, the coherent superposition is performed as $$E=[E2D+(E2D^*)^*]/2. \qquad (19)$$

At step 360, the recovered original optical signal field intended for transmission, E(t), is renormalized, and either directly or with reduced resolution fed into a soft-decision FEC, or hard-decision FEC, to obtain payload data 102. In the case of soft-decision FEC, an outer hard-decision FEC may be additional used.

In various alternative embodiments of methods 200 and 300, the order of certain processing steps may be changed to differ from the order indicated in FIGS. 2 and 3, respectively.

Figure 4:
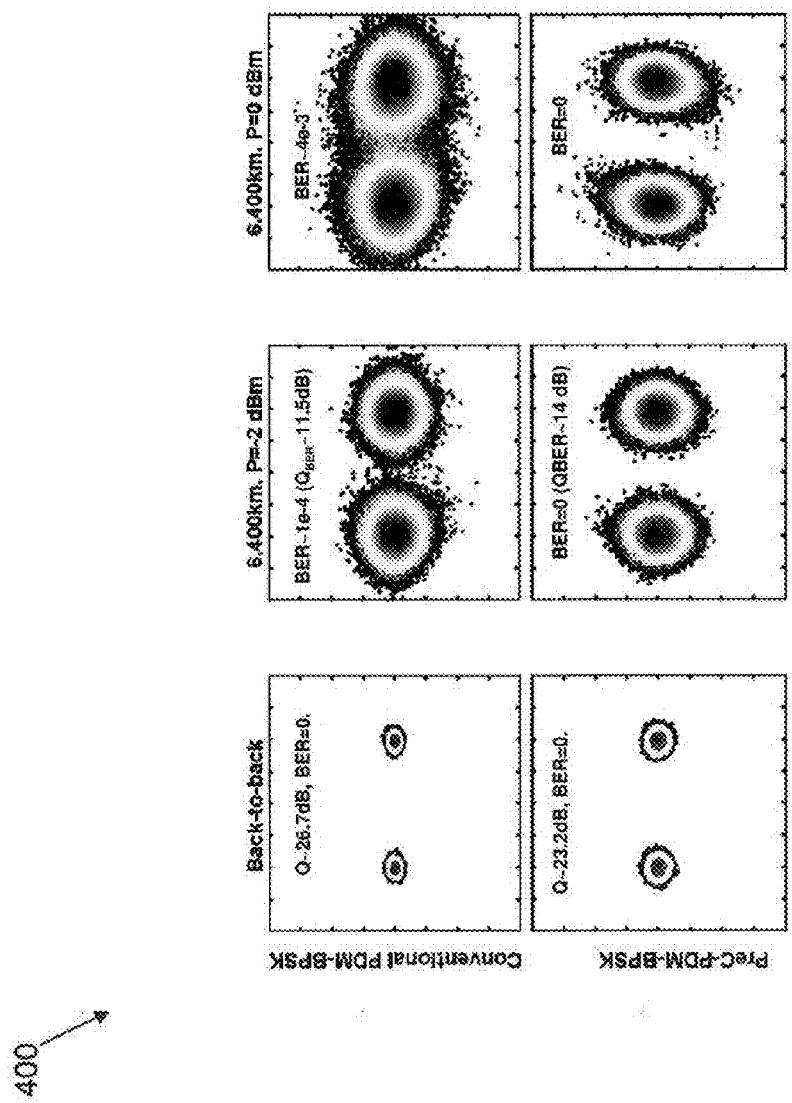
FIG. 4 shows experimentally measured 15-Gbaud BPSK signal constellations in the back-to-back configuration (left), after 6,400 km (80×80 km SSMF spans) with −2 dBm (middle) and 0 dBm (right) signal launch powers, for the case without pre-dispersion compensation (upper row) and with the optimal pre-dispersion compensation (lower row).

FIG. 4 shows experimentally measured 15-Gbaud BPSK signal constellations in the back-to-back configuration (left), after 6,400 km (80×80 km SSMF spans) with −2 dBm (middle) and 0 dBm (right) signal launch powers, for the case without pre-dispersion compensation (upper row, Dpre=0) and with the pre-dispersion compensation according to the principles of the invention (lower row, Dpre=-DL/2, where D=17 ps/nm/km and L=6,400 km). Clearly, the performance obtained when the pre-dispersion compensation according to the principles of the invention is applied is much better than that obtained without pre-dispersion compensation. This outcome is counterintuitive and non-obvious, as dispersion-compensation-free transmission (including no pre-dispersion compensation) is commonly preferred over dispersion-compensated transmission for obtaining "better" nonlinear transmission performance. In addition, the performances in the back-to-back configurations (without long-haul fiber transmission) indicate that pre-dispersion compensation actually results in a performance degradation, due to increased digitization noise from the DACs (as pre-dispersion-compensated signal has a higher peak-to-average-power ratio than the original uncompensated signal). Moreover, the digital signal processing (DSP) load needed to perform both pre-dispersion compensation at the transmitter and post-dispersion compensation at the receiver is usually much larger than that needed to perform post-dispersion compensation only. Thus, performing the pre-dispersion compensation for long-haul optical fiber transmission, especially for dispersion-unmanaged optical links, appears to be not only more burdensome in terms of implementation complexity, but also more detrimental in terms of performance. Also, applicants have confirmed that the performance improvement brought by the optimal pre-dispersion compensation can only be obtained for optical signals that are modulated according to 1-D modulation formats; for instance a signal modulated according to a 2-D format will suffer in performance with the application of the pre-dispersion compensation.

Figure 5:
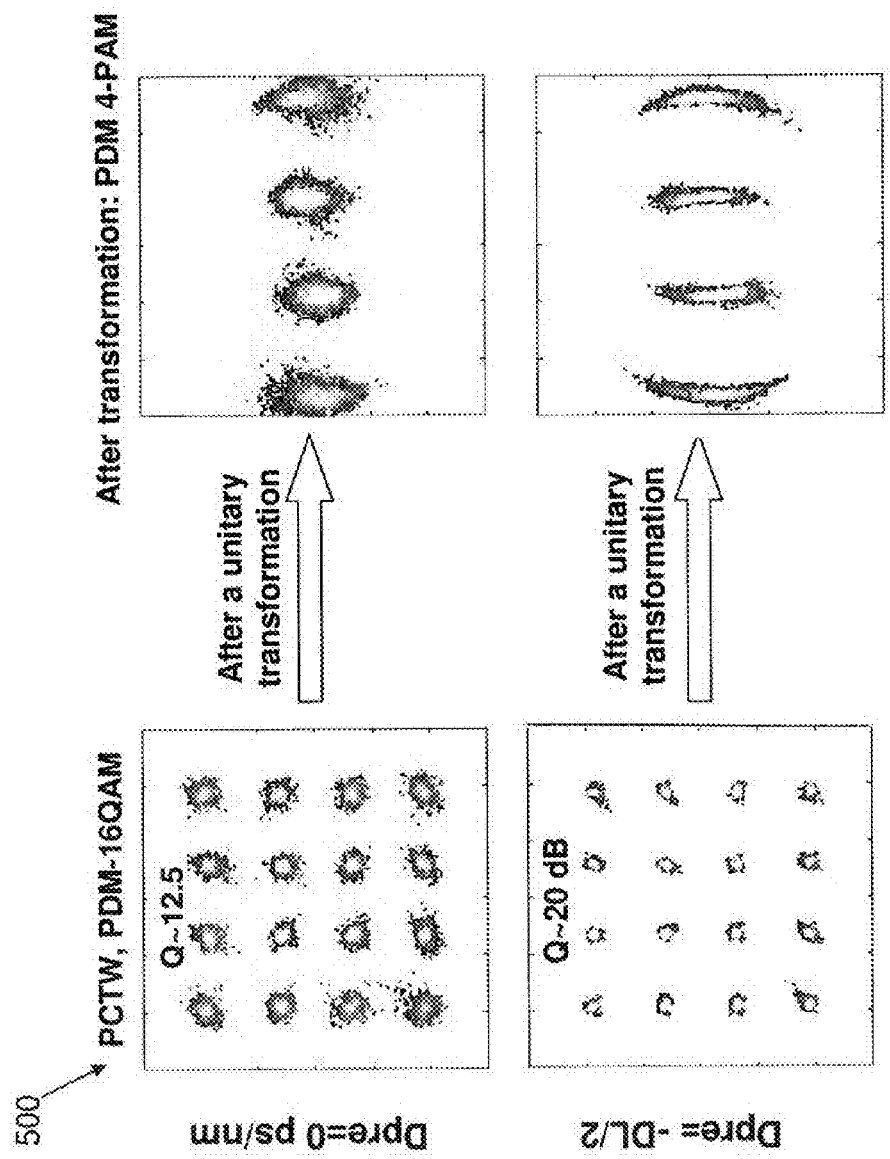
FIG. 5 shows simulated 16-QAM signal constellations (left column) without (upper row) and with (lower row) pre-dispersion compensation, as compared to recovered 4-PAM signal constellations (right column) without (upper row) and with (lower row) pre-dispersion compensation.

FIG. 5 shows simulated 16-QAM signal constellations (left column) without pre-dispersion compensation (upper row, Dpre=0) and with pre-dispersion compensation (lower row, Dpre=-DL/2, where D=17 ps/nm/km and L=3,200 km), as compared to recovered 4-PAM signal constellations (right column) without (upper row) and with (lower row) pre-dispersion compensation. The results are based on simulations with a link of 40×80 km SSMF spans and total mean nonlinear phase shift of 0.5 rad. The results suggest that intuitively, the "nonlinear distortion cancellation" effect due to PCTW is transformed into the "nonlinear distortion squeezing" effect for a pair of 1-D signals (which can be obtained by applying a certain unitary transformation on the PCTW).

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flowcharts, flow diagrams, state transition diagrams, pseudo code, and the like represent various processes which may be substantially represented in computer readable medium and so executed by a computer or processor, whether or not such computer or processor is explicitly shown.

Embodiments of the invention find application in optical communication systems including for example, ultra-long-haul terrestrial and submarine transmission and other optical fiber transmission systems in which increased transmission distance is desirable. Embodiments may also allow rate-adaptive transmission with much improved performance at low net data rates, which may be valuable in ultra-long-haul transmission applications, especially when fibers of high nonlinear coefficients (such as LEAF and TWRS) are used. Compared to conventional approaches to increase the distance of optical fiber transmission, embodiments described herein may result in reduced the complexity and cost (especially the operation cost) of the fiber link, with small modifications at the optical terminals.

What is claimed is:

1. An apparatus comprising an optical transmitter, the optical transmitter comprising:
    a first processor configured to generate a first electronic representation for each of at least two optical signals for carrying payload data modulated according to a one-dimensional (1-D) modulation format, the first processor further configured to induce on respective ones of the first electronic representations an amount of dispersion that depends on a power-weighted accumulated dispersion ($AD_{pw}$) of a transmission link comprising multiple optically amplified homogenous fiber spans through which the at least two optical signals are to be transmitted thereby generating complex-valued electronic representations of pre-dispersion-compensated optical signals; and
    at least two optical modulators, each of the at least two optical modulators for modulating a respective analog version corresponding to a respective one of the complex-valued electronic representations onto a polarization of an optical carrier;
    wherein the first processor is further configured to generate the respective ones of the first electronic representations by performing a unitary transformation on corresponding electronic representations of two phase-conjugated optical signals that are modulated according to a two-dimensional (2-D) modulation format.

2. The apparatus of claim 1 wherein the 1-D modulation format is Binary Phase Shift Keying (BPSK) or m-ary Pulse Amplitude Modulation (m-PAM).

3. The apparatus of claim 1 wherein the 2-D modulation format is a complex valued modulation, quadrature phase-shift keying (QPSK), or n-constellation-point quadrature-amplitude modulation (n-QAM).

4. The apparatus of claim 1 wherein the unitary transformation has a generic form of $$\frac{1}{\sqrt{2}}\begin{pmatrix} 1 & 1 \\ -j & j \end{pmatrix}.$$

5. The apparatus of claim 1 wherein the first processor is configured to generate the first electronic representations for two optical signals for carrying payload data modulated according to a one-dimensional (1-D) modulation format; and wherein each of the first electronic representations is generated by performing a unitary transformation on corresponding electronic representations of two phase-conjugated optical signals that are modulated according to a two-dimensional (2-D) modulation format.

6. The apparatus of claim 1 wherein the at least two modulators are IQ modulators for modulating the complex-valued electronic representations of the pre-dispersion compensated optical signals.

7. The apparatus of claim 1 further including at least two Digital-to-Analog Converters (DACs) for converting respective real and imaginary parts of one of the complex-valued electronic representations to analog representations prior to modulation.

8. The apparatus of claim 1 wherein the processor is configured to generate the first electronic representations by convolving an E-field representation with a pre-dispersion-compensation function.

9. The apparatus of claim 1 wherein the at least two optical signals outputted from the at least two optical modulators are multiplexed via polarization-division multiplexing (PDM), wavelength-division multiplexing (WDM), or space-division multiplexing (SDM), before the at least two optical signals are transmitted through a transmission link.

10. The apparatus of claim 1 wherein the amount of dispersion induced on the first electronic representations at least depends on a power-weighted accumulated dispersion of the transmission link through which the at least two optical signals are to be transmitted.

11. The apparatus of claim 1 wherein the first processor is configured use the overlap-and-add method to electronically pre-compensate complex fields representing the at least two optical signals modulated according to a one-dimensional (1-D) modulation format.

12. The apparatus of claim 1 wherein the apparatus comprises two optical modulators configured to generate two orthogonally-polarized pre-dispersion-compensated optical signals at a same wavelength.

13. The apparatus of claim 1 further comprising:
    an optical receiver for receiving versions of at least two pre-dispersion-compensated optical signals that are originally modulated according to a 1-D modulation format.

14. The apparatus of claim 13 wherein the optical receiver comprises:
    a front-end circuit configured to convert the polarization components of the received versions of at least two pre-dispersion-compensated optical signals carrying modulated payload data into a corresponding plurality of digital electrical signals; and
    a second processor configured to:
        process complex values representing the received versions to obtain electronic representations of transmitted 1-D signals;
        determine payload data based on the electronic representations of the transmitted 1-D signals.

15. The apparatus of claim 14 wherein the second processor is configured to process the complex values representing the received versions to obtain the electronic representations of the transmitted 1-D signals is configured to perform one or more of post-dispersion compensation, time synchronization, channel estimation, channel compensation, frequency estimation, frequency compensation, carrier phase estimation, carrier phase compensation, and forward error correction.

16. The apparatus of claim 14 wherein the second processor is further configured to
    perform an inverse transform corresponding to a unitary transform on ones of the electronic representations of the transmitted 1-D signals to obtain two phase-conjugated 2-D signals; and perform coherent superposition of the two phase-conjugated 2-D signals.

17. The apparatus of claim 16 wherein the inverse transformation has a generic form of $$\frac{1}{\sqrt{2}}\begin{pmatrix} 1 & j \\ 1 & -j \end{pmatrix}.$$

18. A method comprising:

generating, by a first processor, a digital electronic representation for each of at least two optical signals for carrying payload data modulated according to a one-dimensional (1-D) modulation format;

modulating said at least two optical signals by ones of at least two optical modulators, with respective analog versions of said electronic representations, each analog version corresponding to a respective one of the digital electronic representations and having induced thereon an amount of dispersion that depends on a power-weighted accumulated dispersion (AD) of a transmission link comprising multiple optically amplified homogenous fiber spans through which the at least two optical signals are to be transmitted; and further comprising generating respective ones of the first electronic representations by performing a unitary transformation on a corresponding electronic representation of ones of at least two phase-conjugated optical signals modulated according to a two-dimensional (2-D) modulation format.

19. The method of claim 18 wherein generating the first electronic representations comprises:

performing pre-dispersion-compensation to induce an amount of dispersion on the first electronic representation for each of at least two optical signals in the time domain.

20. The method of claim 18 wherein generating the first electronic representations comprises:

performing the pre-dispersion-compensation to induce an amount of dispersion on the first electronic representation for each of at least two optical signals in the frequency domain.

21. The method of claim 18 wherein the amount of dispersion induced on the at least two optical signals is about—$AD_{pw}/2$, where $AD_{pw}$ is the power-weighted accumulated dispersion of the transmission link through which the two optical signals are to be transmitted.

22. The method of claim 18 wherein the at least two optical signals outputted from the at least two optical modulators are multiplexed via polarization-division multiplexing (PDM), wavelength-division multiplexing (WDM), or space-division multiplexing (SDM), before the signals are transmitted through a transmission link.

23. The method of claim 18 wherein the at least two optical signals are received by an optical receiver for recovering the payload data.

* * * * *